(12) United States Patent
Zeidman (10) Patent No.: US 7,050,962 B2
(45) Date of Patent: May 23, 2006

(54) METHOD FOR CONNECTING A HARDWARE EMULATOR TO A NETWORK

(76) Inventor: Robert M. Zeidman, 7599 Squirewood Way, Cupertino, CA (US) 95014

( * ) Notice: Subject to any disclaimer, the term of this patent is extended or adjusted under 35 U.S.C. 154(b) by 937 days.

(21) Appl. No.: 09/751,573

(22) Filed: Dec. 28, 2000

(65) Prior Publication Data

US 2003/0198242 A1 Oct. 23, 2003

Related U.S. Application Data

(60) Provisional application No. 60/193,169, filed on Mar. 28, 2000.

(51) Int. Cl.
*G06F 9/455* (2006.01)
(52) U.S. Cl. ...................................... 703/24
(58) Field of Classification Search .................. 703/24
See application file for complete search history.

(56) References Cited

U.S. PATENT DOCUMENTS

| | | | | |
|---|---|---|---|---|
| 5,280,481 A | * | 1/1994 | Chang et al. ................ | 370/352 |
| 5,299,314 A | * | 3/1994 | Gates .......................... | 710/64 |
| 5,838,919 A | * | 11/1998 | Schwaller et al. .......... | 709/224 |
| 5,911,059 A | * | 6/1999 | Profit, Jr. .................... | 703/23 |
| 6,061,767 A | * | 5/2000 | Kuo et al. ................... | 711/156 |
| 6,067,585 A | * | 5/2000 | Hoang ......................... | 710/11 |
| 6,128,673 A | * | 10/2000 | Aronson et al. ............. | 710/22 |
| 2002/0101824 A1 | * | 8/2002 | Zeidman ..................... | 370/241 |
| 2003/0225556 A1 | * | 12/2003 | Zeidman ..................... | 703/14 |
| 2003/0225564 A1 | * | 12/2003 | Zeidman ..................... | 703/23 |

OTHER PUBLICATIONS

Wen-Tsuen Chen, Yao-Wen Deng, Chuan-Pwu Wang, Nen-Fu Haung, Hwa-Chun Lin, Chung-Chin Lu and Ruay-Chiung Chang, "On the Design of a High-Performance ATM Bridge", IEEE, 1998, pp. 207-213.*

Microsoft Corporation, *"Direct Cable Connection, Using Direct Cable Connection To Connect to Another Computer"*; 2000©; 2 pages.

Laplink 2000, "www.laplink.com", "Complete Access To Your PC From Anywhere"; 2 pages.

* cited by examiner

*Primary Examiner*—Paul L. Rodriguez
*Assistant Examiner*—Dwin M. Craig
(74) *Attorney, Agent, or Firm*—Edward C. Kwok; MacPherson Kwok Chen & Heid LLP (57) ABSTRACT

A system and method for connecting an electronic device to a network running at a higher speed that includes a computer for receiving data packets from the network and storing the received data packets in a first buffer. The computer next transmits the received data packets to the electronic equipment at a slower speed. The computer also receives data packets from the electronic device, and stores the data packets received from the electronic device in a second buffer. The computer then transmits the data packets received from the electronic device to the network at a higher speed.

24 Claims, 5 Drawing Sheets

METHOD FOR CONNECTING A HARDWARE EMULATOR TO A NETWORK

This application claims the benefit of provisional Ser. No. 60/193,169 filed Mar. 28, 2000.

CROSS-REFERENCE TO CD-ROM APPENDIX

A part of the present disclosure is provided in CD-ROM Appendix A as source code that is subject to copyright protection. The copyright owner has no objection to the facsimile reproduction by anyone of the patent document or the patent disclosure, as it appears in the patent and trademark office patent files or records, but otherwise reserves all copyright rights whatsoever. CD-ROM Appendix A consists of directories "MOLASS~3" and "MOLASS~6" having 29 files and 36 files, respectively. A printed listing of these directories is included herein as Appendix B.

BACKGROUND OF THE INVENTION

Prior to reducing an integrated circuit design to a form suitable for fabrication, the integrated circuit design is often emulated to allow the design to be optimized and debugged. A hardware emulator suitable for such use typically includes field programmable gate arrays (FPGAs) which serve as a breadboard for implementing the integrated circuit design. (In the remainder of this disclosure, the term "emulator" or "circuit emulator" means a hardware emulator, unless otherwise specified). But, such an emulator typically runs at a slower speed than a computer network (e.g., an Ethernet network).

When an integrated circuit that has a computer network interface is emulated, network activities are usually emulated at the speed of the circuit emulator. A conventional network-emulation device is typically connected to a port of the circuit emulator. The circuit emulator receives data packets from the network-emulation device, re-packages the data and transmits the re-packaged data back at the speed of the circuit emulator. The re-packaged data is then received by the network-emulation device, which inspects the re-packaged data to determine if the integrated circuit under emulation in the circuit emulator correctly sends and receives data packets. However, on balance, such a conventional network-emulation device does not emulate network behavior accurately and correctly.

Alternatively, another conventional technique for connecting a circuit emulator to the network requires slowing down the network, receiving signals from the slowed network and translating the signals into suitable electrical signals in the form that the circuit emulator can accept. The circuit emulator, which typically operates at a slower speed than the network, can also send packets to the slowed network. However, because the network is designed to operate at a different speed, timing issues may arise in such a slowed network. These timing issues may require further modification to the network to resolve. Such modifications are undesirable because the modified network may not adequately represent network characteristics. Because not all network devices can be slowed to the circuit emulator speed, the circuit emulator is typically also limited to communication with a small subset of devices on the network.

Further, a typical circuit emulator is a digital device that does not generate the required analog waveforms for data communication on a network. In addition, the circuit emulator interface to the network requires a significant amount of memory, which requires complex memory management.

SUMMARY OF THE INVENTION

The present invention allows a circuit emulator to connect to a computer network at full network speed using a standard interface, such as a serial port, a high-speed parallel port, a small computer system interface (SCSI) or a universal serial bus (USB).

The invention provides a method and an apparatus for transferring data packets between an emulated device in a circuit emulator and the network. In one embodiment, an interface software program installed on a host computer (e.g., a personal computer) is provided to handle communication between the network and the circuit emulator. The network can be, for example, an Ethernet network.

According to the present invention, data packets addressed to an emulated device in the circuit emulator, or alternatively, addressed to a workstation connected to the network through the emulated device, is received and stored in buffers of the host computer. (In one example, a workstation is connected to a network through an emulated network interface card.) The interface software in the host computer repackages the data packet into a second format for transmission to the emulated device at the speed of the emulated device. Under this arrangement, the interface software in the host computer need not send to the circuit emulator, for example, the preamble required to synchronize the clocks of the network and the emulated device, because the circuit emulator does not have the analog circuits required to respond to the preamble. Similarly, the interface software in the host computer repackages the data packets received from the circuit emulator into proper format for transmission to the network at full network speed. Under this arrangement, the existing memory in the host computer is used to buffer data packets communicated between the circuit emulator and the network, so that data packets received from the network at network speed are transmitted to the circuit emulator at a slower speed, and data packets received from the circuit emulator at the slower speed is provided to the network at full network speed. Thus, the costs of providing additional memory and management of such additional memory in a circuit emulator are avoided.

In one embodiment, the present invention allows the interface software of a host computer to individually examine a data packet of a conventional off-the-shelf interface card to identify the beginning and the end of the packet. When the beginning and the end of a data packet can be identified, the interface software of the host computer ignores data packets not addressed to the circuit emulator. Consequently, compared to the prior art, a much smaller amount of buffer memory is required. This arrangement loses data packets only in the occasional event of a buffer overflow, thus effectively preventing network connection loss.

In one embodiment, the interface software of the host computer is implemented as a multithreaded program having, in one instance, two executing threads. One thread is a task that receives data packets from the network interface card, stores the received data packets in a buffer, retrieves the stored data for repackaging, and sends the repackaged data over the circuit emulator interface to the circuit emulator. Another thread is a task that receives packets from the circuit emulator interface, repackages the data into a network data packet and sends the network data packet over the network interface card to the network.

In another embodiment, the interface software of the host computer is implemented as a multithread program including four executing threads. One thread is a task that receives data packets from the network, and stores the received data packets in a buffer. A second thread is a task that polls the buffer for the received data packets. This second thread repackages the data packets and sends the repackaged packets over the emulator interface to the circuit emulator. A third thread is a task that receives data packets from the circuit emulator over the emulator interface and stores the received packets in a second buffer. A fourth thread is a task that polls the second buffer for the data packets received from the circuit emulator. This fourth thread repackages these data packets and sends the repackaged packets over the network interface to the network.

In yet another embodiment, the interface software of the host computer is also implemented as a multithread program, as in the previous embodiment, except that the second buffer is eliminated and the third and fourth tasks are combined into a single task executing as a single thread. In this embodiment, the single task receives data packets from the emulator interface from the circuit emulator, repackages the data packets received and sends the repackaged packets over the network interface to the network. This approach is possible when the circuit emulator runs at a much slower speed than the network, such that a data packet received from the circuit emulator can be repackaged and sent to the network before the next data packet's arrival from the circuit emulator.

Further features and advantages of various embodiments of the invention are described in the detailed description below, which is given by way of example only.

BRIEF DESCRIPTION OF THE DRAWINGS

In the following detailed description, like elements are provided like reference numerals.

DETAILED DESCRIPTION

Figure 1:
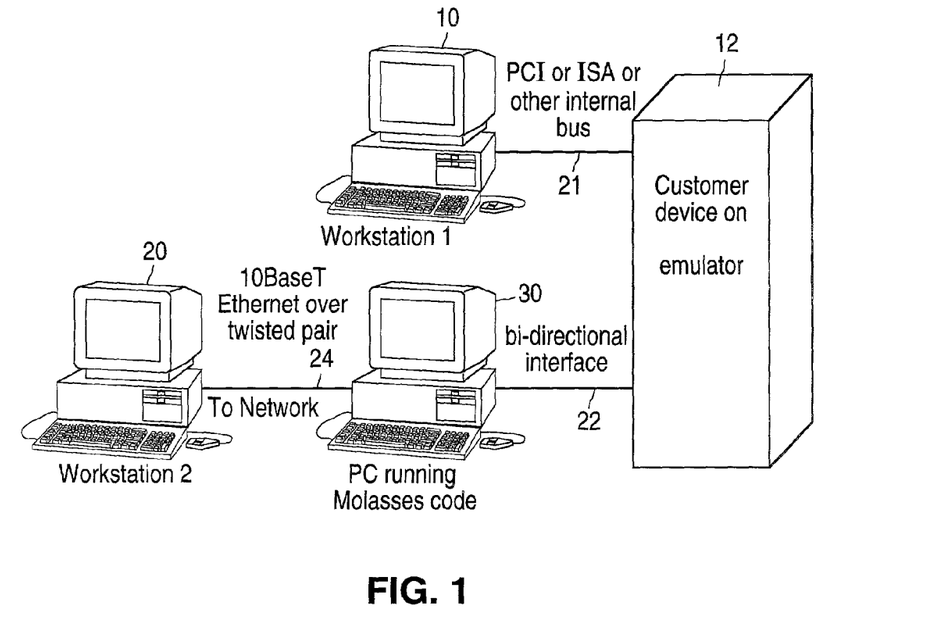
FIG. 1 shows a configuration including first workstation 10, second workstation 20, host computer 30 and circuit emulator 12, in accordance with the present invention.

The present invention is illustrated in the following using, as an example, an emulation of a network interface device. FIG. 1 shows a configuration including first workstation 10, second workstation 20, host computer 30 and circuit emulator 12. In this embodiment, a network interface card is emulated in circuit emulator 12, which interfaces with first workstation 10 over a conventional internal bus (e.g., a PCI bus). The network interface card emulated is intended to operate as a network interface of a workstation, such as workstation 10. However, circuit emulator 12 does not operate at the full network speed the network interface card is intended. Circuit emulator 12 is connected to host computer 30 over bidirectional interface 22, such as a conventional personal computer (PC) parallel port. Host computer 30 runs an interface program "Molasses" which is discussed in further detail below in conjunction with FIG. 4. (A copy of the source code for Molasses program is included in appendix A.) Host computer 30 connects to conventional computer network 24 (e.g., 10BaseT Ethernet over twisted pair) using a conventional network interface. Workstation 20 communicates with host computer 30 over computer network 24 using conventional network protocols. Host computer 30 can be, for example, a desktop PC running Windows 95 or Windows 98 and equipped with a 10baseT Ethernet controller card and two parallel ports. A proprietary parallel port interface can be used for faster transfer speeds or easier connection to circuit emulator 12. In one embodiment, host computer 30 includes an Intel Pentium class processor and is equipped with 32 Mbytes of DRAM and 500 Mbytes of hard disk space. Host computer 30 also includes Media Access Controller ("MAC") drivers, parallel port drivers and the NDIS API (Network Driver Interface Specification-Application Program Interface). MAC drivers interface the operating system to the Ethernet card hardware. The parallel port drivers allow the operating system to interact with the parallel port hardware, and the NDIS API allows functional enhancements to network drivers in the operating system. Host computer 30 also includes a Graphical Users Interface ("GUI") and a packet capture, buffering and transmission application program, which will be described in further detail later. Workstation 10 and 20 can each be any conventional workstation, including a PC running the Windows 98 operating system.

Figure 2:
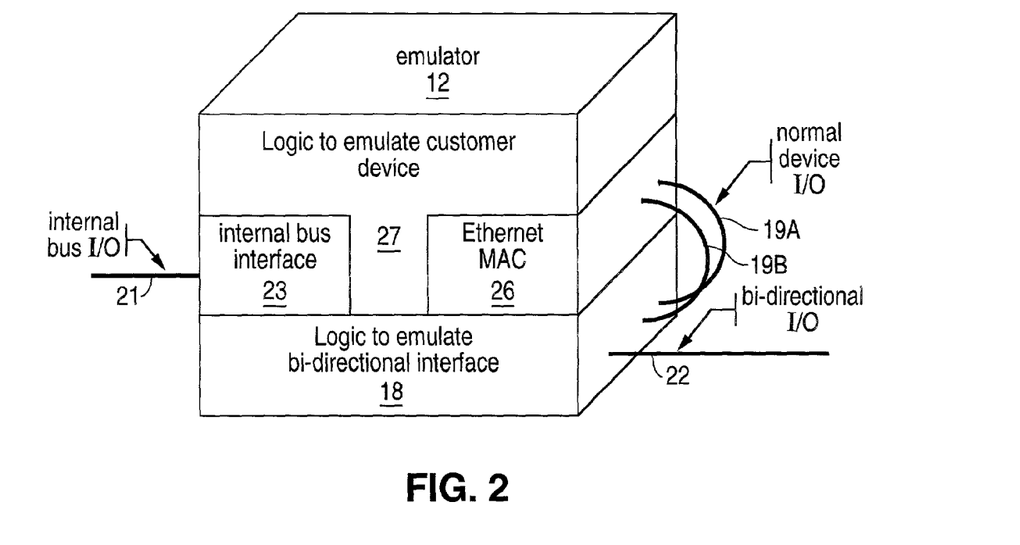
FIG. 2 is a block diagram showing one configuration of circuit emulator 12, during an emulation of a network interface card.

FIG. 2 is a block diagram of one configuration of circuit emulator 12 during an emulation of the network interface card. As shown in FIG. 2, circuit emulator 12 provides logic circuit 18 that couples circuit emulator 12's circuit to bidirectional interface 22, an emulated Ethernet MAC 26, interface 23 to internal bus 21, and logic circuit 27, which is the remainder of the emulated network interface card. Cable assemblies 19A and 19B connect the input terminals and the output terminals ("I/O terminals") of Ethernet MAC 26 and logic circuit 18. Logic circuit 18 translates the signals of Ethernet MAC 26 (communicated over cable assemblies 19A) into the signals of bi-directional interface 22 for transmitting to host computer 30. In one embodiment, computer network 24 includes a conventional hub providing 10baseT connections. Alternatively, computer network 24 can also include a switch, which selectively transmits data packet based on destination addresses. Use of a switch can reduce packet traffic at a particular connection, and thus reduce the buffer requirements at the connected devices (e.g., host computer 30). Providing a switch at host computer 30's connection to computer network 24 also simplifies the Molasses program 50 running on host computer 30. In this configuration, emulator 12's connection to workstation 10 over internal bus 21 allows examination of signals in logic circuits 18 and 27 for debugging purpose.

Figure 3:
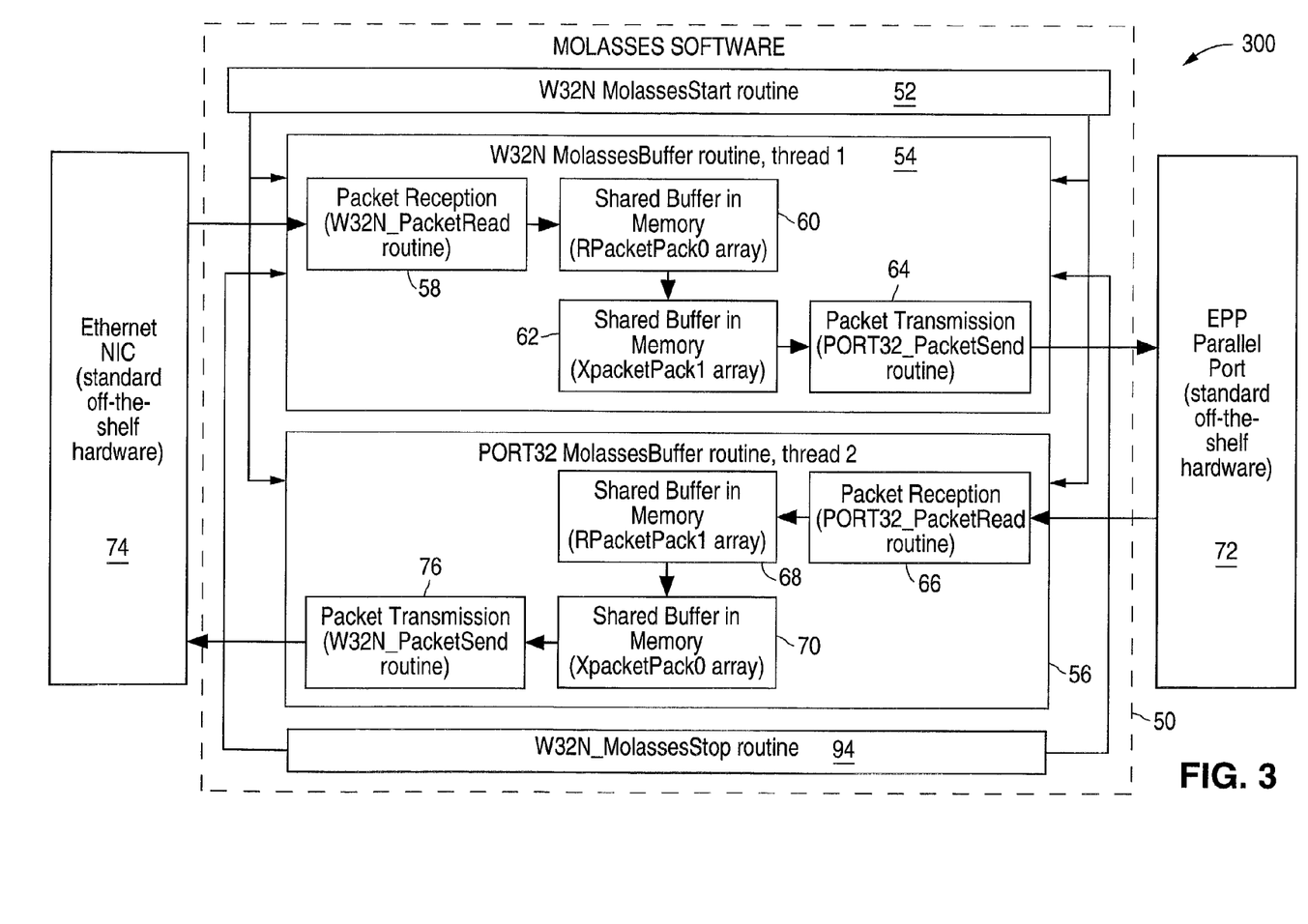
FIG. 3 is a block diagram 300 showing the functions performed by Molasses program 50, in accordance with one embodiment of the present invention.
Figure 4:
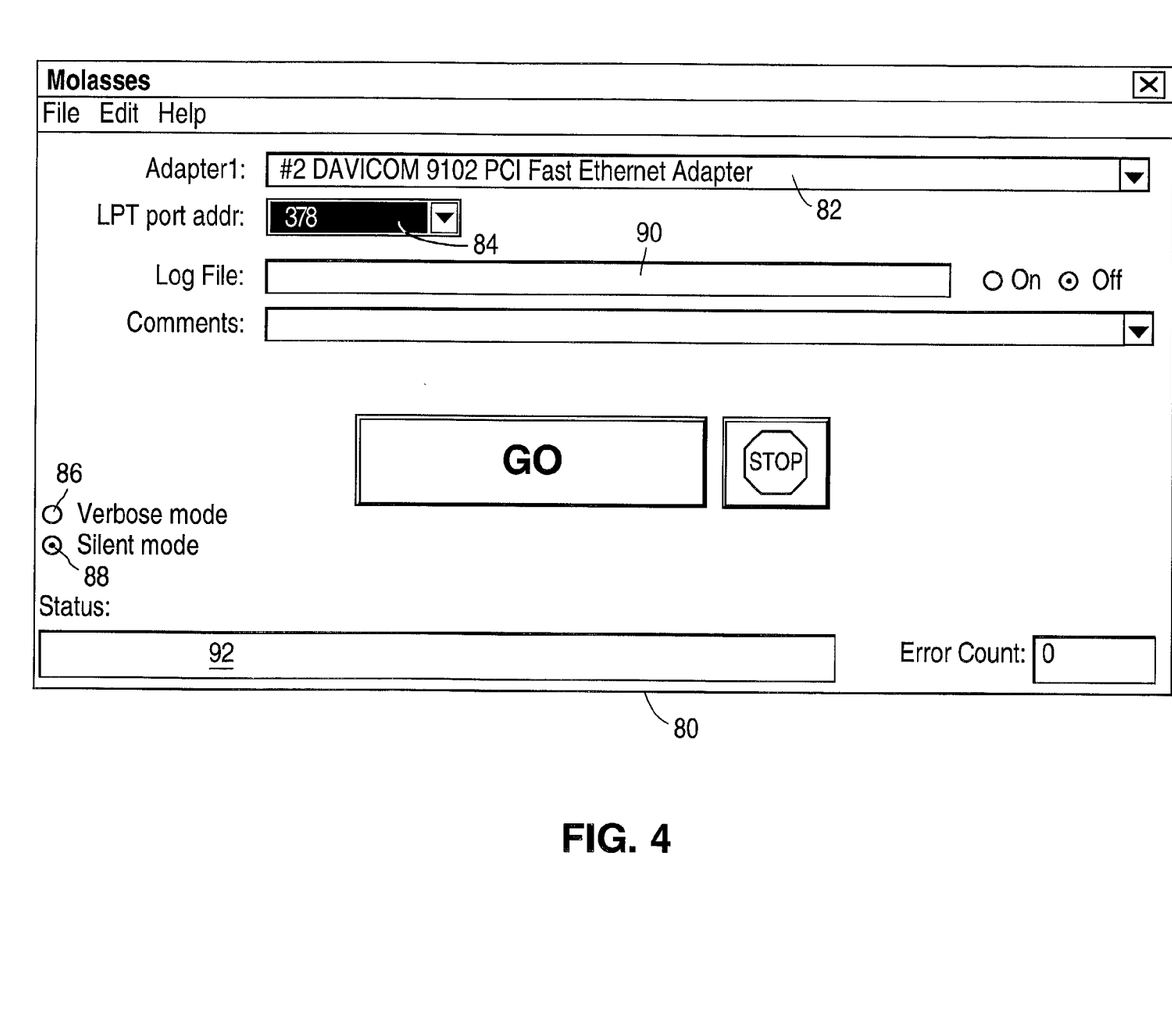
FIG. 4 shows a user interface Mainscreen 80 in Molasses program 50.

FIG. 3 is a block diagram 300 showing the functions performed by Molasses program 50, in accordance with one embodiment of the present invention. Molasses program 50 includes a graphical user interface illustrated in FIG. 4 by Mainscreen 80. As shown in FIG. 4, Mainscreen 80 allows the user to specify an Ethernet NIC (act 82) and a port address for bidirectional interface 22 connected to emulator 12 (act 84). Status line 92 displays continuously information about packets being processed by Molasses program 50. The amount of information to be shown on status line 92 can be selected using verbose mode option 86 and silent mode option 88. The user can also specify a log file (act 90) to record information such as the value of each byte in each data packet, a count or the nature of errors that occur, or comments that the user may wish to add. The log file can be used for future reference and debugging purposes.

Referring back to FIG. 3, Molasses program 50 interfaces with network interface card (NIC) 74, which provides host computer 30's access to computer network 24, and interface 72, which couples host computer 30 through bidirectional interface 22 to circuit emulator 12. In this embodiment, interface 72 can be a conventional parallel port operating under the conventional EPP standard. Once the parameters of Mainscreen 80 are set, Mainscreen 80 calls "W32N_MolassesStart" routine 52. Routine 52 creates simultaneous threads running "W32N_MolassesBuffer" routine 54 and "PORT32_MolassesBuffer" routine 56, respectively. W32N_MolassesBuffer routine 54 receives packets from the Ethernet NIC 74 (via a W32N_PacketRead routine 58), stores the received packets into receive buffer 60 ("RPacketPack0") in host computer 30's main memory. Subsequently, the received packets in buffer 60 are transferred to transmit buffer 62 ("XPacketPack1"), from which they are then transmitted to interface 72 via "PORT32_PacketSend" routine 64. PORT32_MolassesBuffer routine 56 receives packets from interface 72 (via "PORT32_PacketRead" routine 66), stores the packets into receive buffer 68 ("RPacketPack1"). Subsequently, routine 56 then transfers the data packets in buffer 68 to a transmit buffer 70 ("XPacketPack0"), which are then transmitted to the Ethernet NIC 74 via "W32N_PacketSend" routine 76. Molasses program 50 converts data packet formats, when necessary. For example, the preamble that is used in a packet for synchronizing the clock signals of the network and the emulated device is removed before being forwarded to circuit emulator 12 over interface 72.

Mainscreen 80 calls "W32N_MolassesStop" routine 94 to terminate execution of both threads 54 and 56.

Figure 6:
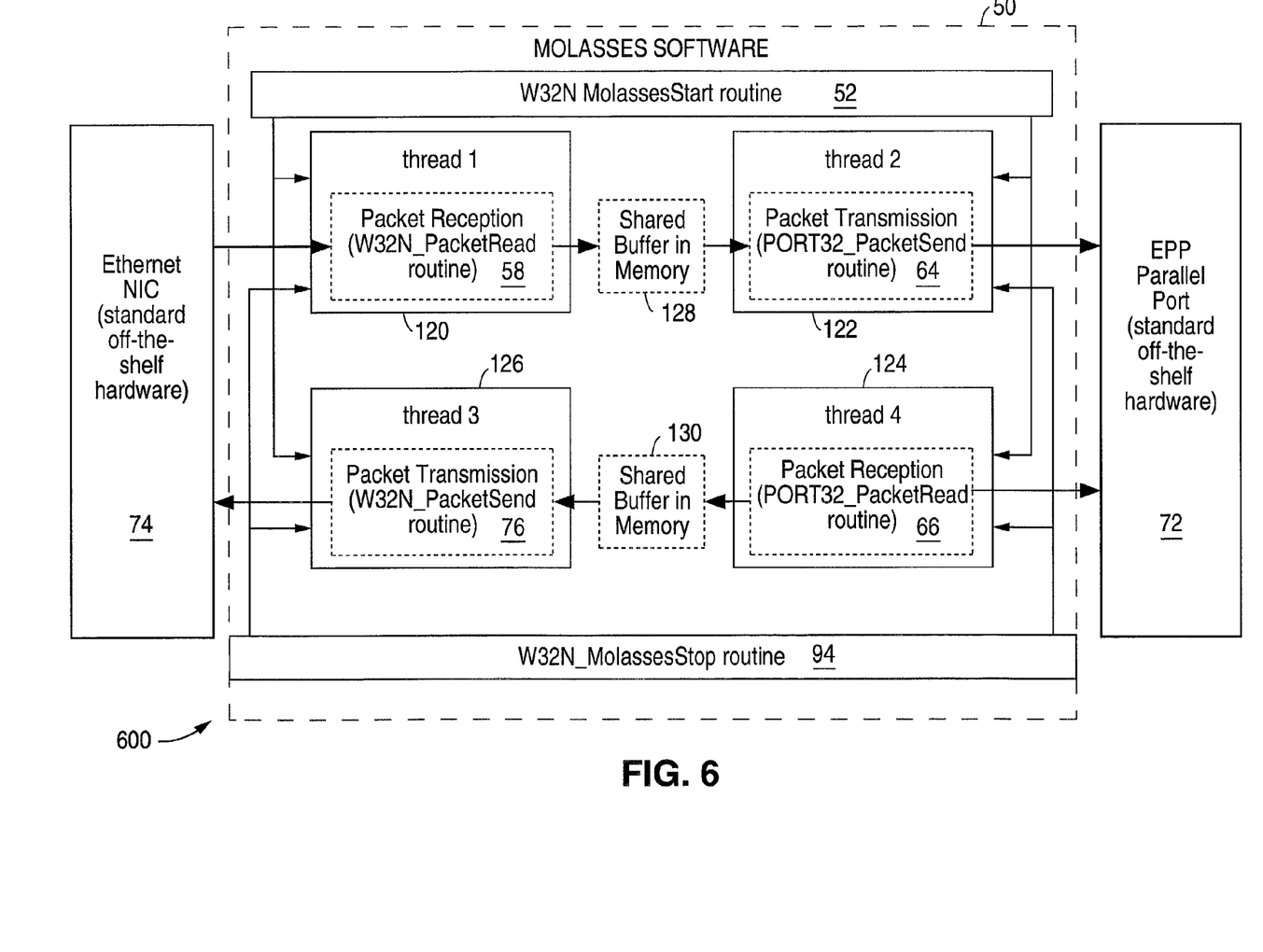
FIG. 6 is a block diagram 600 showing the functions performed by Molasses program 40, in accordance with a second embodiment of the present invention.

FIG. 6 is a block diagram 600 showing the functions performed by Molasses program 40, in accordance with a second embodiment of the present invention. As in Molasses program 50 of FIG. 3, Molasses program 40 of FIG. 6 interfaces with network interface 74, which provides host computer 30's access to computer network 24, and interface 72, which couples host computer 30 to bidirectional interface 22 to circuit emulator 12. Interface 72 can be implemented by a conventional parallel port operating under, for example, the EPP standard. Once the parameters of Mainscreen 80 (FIG. 4) are set, Mainscreen 80 calls "W32N_MolassesStart" routine 52, which creates four threads 120, 122, 124 and 126. Thread 120 executes "W32_PacketRead" routine 58, which receives data packets from Ethernet NIC 74 and stores the received data packet into shared buffer 128 in the main memory of the host computer 30. Thread 122 executes "Port32_PacketSend" routine 64, which polls shared buffer 128 for the received data packets, repackages these data packets and sends them to circuit emulator 12 over emulation interface (parallel port) 72. Thread 124 executes "Port32_PacketRead" routine 66, which receives data packets from circuit emulator 12 over parallel port 72 and stores the received data packet into shared buffer 130. Thread 126 executes a "W32N_PacketSend" routine 76, which polls shared buffer 130 for data packets, repackages the data packets and sends them into network 24 over Ethernet NIC 74.

Because circuit emulator 12 typically runs at a speed much slower than devices on network 24, an alternative embodiment combines threads 124 and 126 and eliminates shared buffer 130, taking advantage that W32N_PacketSend routine 76 can complete repackaging and sending out a data packet to network 24 before arrival of the next data packet from circuit emulator 12 over parallel port 72.

Mainscreen 80 calls "W32N_MolassesStop" routine 94 to terminate execution of both threads 120, 122, 124 and 126.

The size of each of buffers 60, 62, 68 and 70, 128 and 130 can be changed dynamically. Even then, a buffer overflow condition can occasionally occur, resulting in data packets being discarded. Typically, discarding an incomplete packet risks losing a network connection. However, there is no risk of losing a network connection under the present invention, because only whole packets are discarded.

Figure 5:
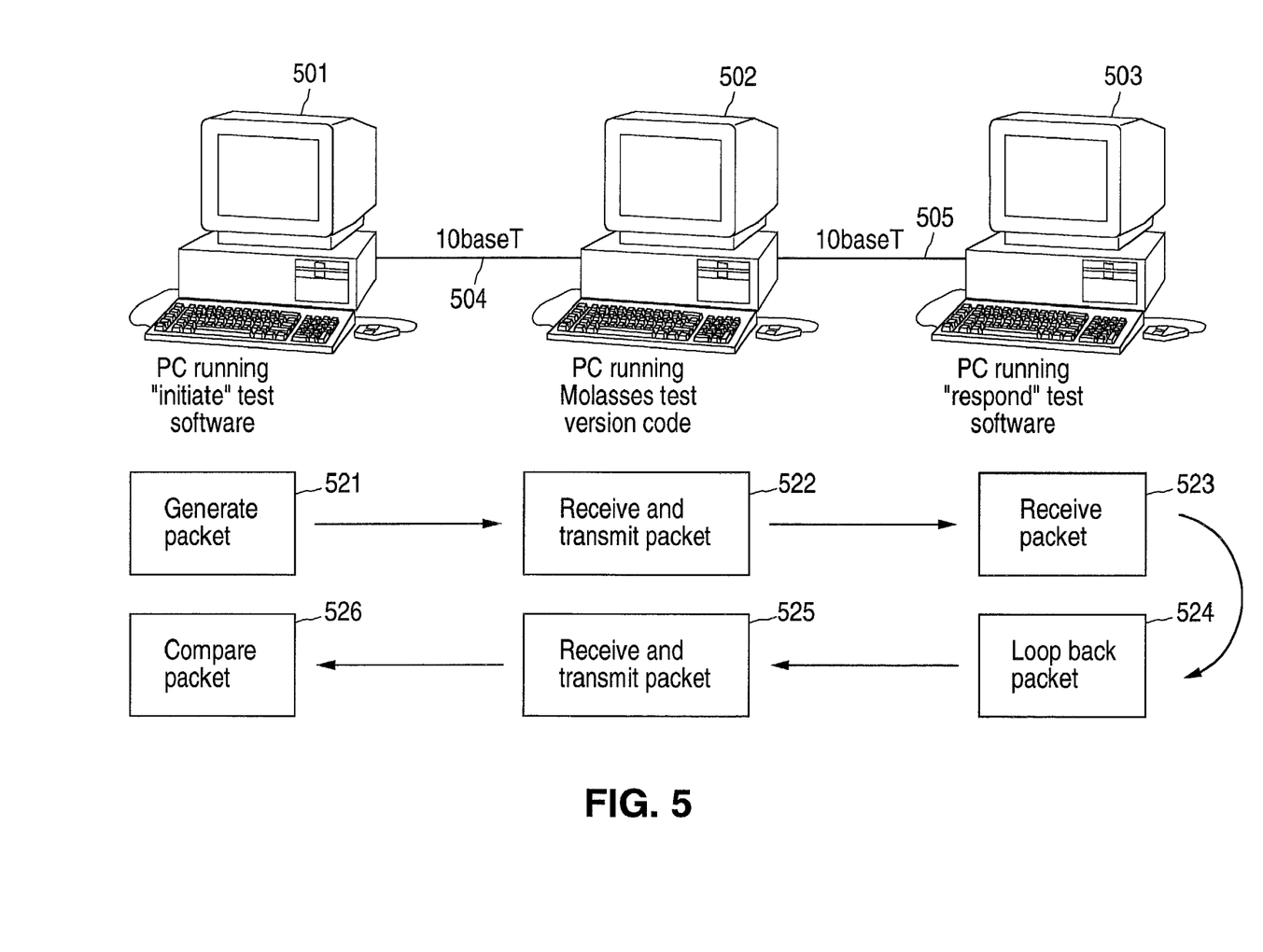
FIG. 5 shows a test setup suitable for a self-test in Molasses program 50, involving three personal computers (PC).

Both Molasses program 50 and Molasses program 40 include a test program for self-test. FIG. 5 shows a test setup suitable for use with the self-test involving PCs 501, 502 and 503. For brevity, this test program is described with respect to Molasses program 50. Description herein regarding Molasses program 50 is equally applicable to Molasses program 40. The test program has two modes of operation— "initiate" and "respond". PC 502 runs Molasses program 50, configured to address two Ethernet network interface cards, rather than the bi-directional interface, as in FIG. 1. PC 501 runs the test software in initiate mode, generating and sending Ethernet packets of varying size to PC 502 via local area network 504 (e.g., Ethernet with 10BaseT connections) at step 521. At step 522, Molasses program 50 of PC 502 receives the packets from PC 501 using one of its two network interface cards, and then forwards the received packets to PC 503 over network 505, which is coupled to the other one of its network interface cards. PC 503 runs the test software in respond mode, taking each packet received from PC 502 (step 523) and re-transmitting it back to PC 502 over local area network 505 (step 524). At step 525, Molasses software of PC 502 then forwards the received packet from PC 503 to PC 501 over local area network 504. There, at step 526, under initiate mode, the test software on PC 501 compares the returned packet to the packet it transmitted at step 521. Any mismatch of these packets is reported as an error. In one embodiment, a timer can be set in $\frac{1}{18}$-second increments to specify the frequency of packet generation in PC 102.

A user interface is provided by the test program to self-test Molasses program 50. The user interface displays an appropriate amount of information, based on a user's selection of silent mode or verbose mode. Through this user interface, a user can vary a packet throughput rate, effectuate an overflow condition in any of buffers 60, 62, 68, 70, 128 and 130, or test for timing and throughput problems. A status line is provided in the user interface to continuously update information about packets processed by Molasses program 50, such as the number of packets sent and received, the current value of the timer, an error count, and other status information desired. In addition, a log file can be specified to record the value of each byte of each packet, errors that occurred, and comments that the user may wish to add using a comment line in the user interface. The recorded information may be used for future reference and debugging.

The test program also provides a test for accessing circuit emulator 12 through a bi-directional interface (e.g., a parallel port). In one embodiment, an industry standard parallel port conforming to the enhanced parallel port (EPP) standard is provided. The test program allows a user to read and write 8-bit addresses and 8-bit data patterns via the parallel port to circuit emulator 12. In one test, data is continuously written to and read back from circuit emulator 12 and compared. Any mismatch between the written data and the read back data is reported as an error.

Although only source code illustrating packet capture, buffering and transmission in one embodiment of the present invention is listed in Microfiche Appendix A, various modifications and adaptations of such operations would be apparent to those skilled in the art based on the above disclosure. Many variations and modifications within the scope of the present invention are therefore possible. The present invention is set forth by the following claims.

I claim:

1. A method for connecting an emulated electronic device to a network operating at a specified bit-rate higher than the emulated electronic device, the method comprising:
    providing a computer having a network interface, an emulation interface and a memory, the network interface being capable of communicating with the network at the specified bit-rate;
    connecting the computer through the network interface with the network and through the emulation interface with the emulated electronic device; and
    executing in the computer a network handling program which performs:
        (a) receiving data packets from the network through a the network interface;
        (b) storing the data packets received from the network in a first buffer in the memory;
        (c) transmitting the data packets in the first buffer to the emulated electronic device through the emulation interface;
        (d) receiving data packets from the emulated electronic device through the emulation interface; and
        (e) transmitting the data packets received from the emulated electronic device to the network through the network interface.

2. The method of claim 1 further comprising storing the data packets received from the emulated electronic device in a second buffer in memory and wherein the step of transmitting the data packets received from the emulated electronic device comprises retrieving the data packets from the second buffer.

3. The method of claim 1, wherein the first buffer comprises a receive buffer and a transmit buffer, said method further comprises:
    storing the data packets received from the network in the receive buffer; and
    transferring the data packets stored in the receive buffer to the transmit buffer.

4. The method of claim 2, wherein the second buffer comprises a receive buffer and a transmit buffer, said method further comprises:
    storing the data packets received from the network in the receive buffer; and
    transferring the data packets stored in the receive buffer to the transmit buffer.

5. The method of claim 1, further comprising changing the size of the first buffer at run time.

6. The method of claim 1, further comprising discarding packets of data when the first buffer is full.

7. The method of claim 1, further comprising keeping a record of the data packets received from the network, the data packets transmitted to the emulated electronic device, the data packets received from the emulated electronic device; and the data packets transmitted to the network.

8. The method of claim 7, further comprising displaying the record on a screen.

9. The method of claim 7, further comprising storing the record in a file.

10. The method of claim 1, further comprising recording the throughput of the data packets.

11. The method of claim 1 further comprising modifying the packets to make the packets suitable for receipt by the emulated device.

12. The method of claim 11 wherein modifying includes removing a preamble from a data packet.

13. The method of claim 1, wherein the receiving data packets from the network, and the storing the data packets received from the network and the transmitting the data packets in the first buffer are executed in a first thread and the receiving data packets from the emulated electronic device and the transmitting the data packets received from the emulated electronic device are executed in a second thread.

14. The method of claim 1, wherein the receiving data packets from the network and the storing of data packets received from the network are executed in a first thread, the transmitting the data packets received in the first buffer is executed in a second thread, the receiving data packets from the emulated electronic device and the transmitting the data packets received from the emulated electronic device are executed in a third thread.

15. The method of claim 1, wherein the receiving data packets from the network and the storing of data packets received from the network are executed in a first thread, the transmitting the data packets in the first buffer is executed in a second thread, the receiving data packets from the emulated electronic device is executed in a third thread, and the transmitting the data packets received from the emulated electronic device is executed in a fourth thread.

16. The method of claim 2, wherein the receiving data packets from the network and the storing of data packets received from the network are executed in a first thread, the transmitting the data packets in the first buffer is executed in a second thread, the receiving data packets from the emulated electronic device and storing the data packets received from the emulated electronic device are executed in a third thread, and the transmitting the data packets received from the emulated electronic device is executed in a fourth thread.

17. A method as in claim 1, further comprising, for testing the operation of the computer executing the network handling program:
    generating a data packet in a second computer;
    transmitting the data packet, from the second computer to the computer executing the network handling program;
    transmitting back the data packet received by the computer executing the network handling program to the second computer;
    comparing the data packet received by the second computer with the data packet that was sent by the computer executing the network handling program; and
    reporting an error if the data packet received by the second computer does not match the data packet that was sent by the computer executing the network handling program.

18. A method-as in claim 17, wherein the step of transmitting the data packet comprises:
    at the computer executing the network handling program, transmitting the data stored in the first buffer to a third computer;

at the third computer, transmitting back the data packet received to the computer executing the network handling program; and at the computer executing the network handling program, transmitting the data received from the third computer to the second computer.

19. An apparatus for connecting an emulated electronic device to a network running at a specified bit-rate higher than the emulated electronic device, the apparatus comprising:

a computer having a memory, a network interface capable of operating at the specified bit-rate for connecting the computer to the network and an emulation interface for connecting the computer to the emulated electronic device; and computer instructions executable by the computer for:
creating a first buffer in the memory;
receiving data packets from the network through the network interface;
storing data packets received from the network in the first buffer;
transmitting the data packets in the first buffer to the emulated electronic device through the emulation interface;
receiving the data packets from the emulated electronic device through the emulation interface; and
transmitting the data packets received from the emulated electronic device to the network through the network interface.

20. The apparatus of claim 19 wherein the emulation interface comprises:
a parallel port card; and
a parallel port cable to connect the computer to the electronic device.

21. The apparatus of claim 19, wherein the emulation interface comprises:
a bi-directional interface card; and
a bi-directional interface cable.

22. The method of claim 2, further comprising discarding data packets when the second buffer is full.

23. The method of claim 3, further comprising discarding data packets when either one of the receive buffer and the transmit buffer is full.

24. The method of claim 4, flulher comprising discarding data packets when either one of the receive buffer and the transmit buffer is full.

* * * * *